United States Patent
Aonuma et al.

(10) Patent No.: US 8,849,912 B2
(45) Date of Patent: Sep. 30, 2014

(54) INFORMATION PROCESSING DEVICE, SERVER, AND INFORMATION PROCESSING SYSTEM

(75) Inventors: Hiroaki Aonuma, Kanagawa (JP); Yasutaka Miwa, Tokyo (JP); Masayuki Kasai, Tokyo (JP); Nobukazu Koyama, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 312 days.

(21) Appl. No.: 13/480,584

(22) Filed: May 25, 2012

(65) Prior Publication Data

US 2012/0311041 A1 Dec. 6, 2012

(30) Foreign Application Priority Data

Jun. 2, 2011 (JP) ................................ 2011-124570

(51) Int. Cl.
G06F 15/16 (2006.01)
A63F 13/30 (2014.01)
H04L 29/06 (2006.01)
H04L 29/08 (2006.01)

(52) U.S. Cl.
CPC ........... *H04L 67/24* (2013.01); *A63F 2300/535* (2013.01); *A63F 13/12* (2013.01); *A63F 2300/556* (2013.01); *H04L 67/38* (2013.01); *A63F 2300/401* (2013.01); *H04L 67/36* (2013.01); *A63F 2300/5566* (2013.01); *A63F 2300/408* (2013.01)
USPC ........... 709/204; 709/205; 709/206; 709/217; 709/219

(58) Field of Classification Search
USPC .......................... 709/204, 205, 206, 217, 219
See application file for complete search history.

(56) References Cited

U.S. PATENT DOCUMENTS

| | | | |
|---|---|---|---|
| 7,288,028 B2 | 10/2007 | Rodriquez | |
| 7,558,820 B2 | 7/2009 | Kimoto | |
| 8,388,446 B1 * | 3/2013 | Craine et al. | 463/42 |
| 2002/0111907 A1 * | 8/2002 | Ling | 705/41 |
| 2003/0154293 A1 | 8/2003 | Zmilek | |
| 2003/0217098 A1 | 11/2003 | Bobde et al. | |

(Continued)

FOREIGN PATENT DOCUMENTS

| | | |
|---|---|---|
| JP | 2005103265 A | 4/2005 |
| JP | 2011500277 A | 1/2011 |
| WO | 2009055358 A2 | 4/2009 |

OTHER PUBLICATIONS

European search report for corresponding European Patent Application No. 12004047.2, dated Oct. 2, 2012.

(Continued)

*Primary Examiner* — Liangche A Wang
(74) *Attorney, Agent, or Firm* — Matthew B. Dernier, Esq.; Gibson & Dernier LLP

(57) ABSTRACT

An acquisition unit acquires presence information of an information processing device of another via server. When the acquisition unit acquires pieces of presence information including the same user account from two or more information processing devices, a status image generation unit generates a status image indicating a status of the user identified by the user account, by referring to the latest presence information. In order to represent the status of the user, the status image generation unit includes a name of an application being run by the user in the status image.

13 Claims, 8 Drawing Sheets

(56) References Cited

U.S. PATENT DOCUMENTS

| | | | |
|---|---|---|---|
| 2005/0070359 A1 | 3/2005 | Rodriquez | |
| 2005/0120214 A1* | 6/2005 | Yeates et al. | 713/171 |
| 2007/0218997 A1* | 9/2007 | Cho | 463/42 |
| 2009/0075738 A1* | 3/2009 | Pearce | 463/42 |
| 2009/0111576 A1* | 4/2009 | Ostergren et al. | 463/29 |
| 2009/0181767 A1* | 7/2009 | Feng | 463/29 |
| 2010/0041457 A1* | 2/2010 | Cook et al. | 463/16 |
| 2010/0248843 A1* | 9/2010 | Karsten | 463/43 |
| 2012/0115603 A1* | 5/2012 | Shuster | 463/31 |

OTHER PUBLICATIONS

Office Action issued for corresponding Japanese Patent Application No. 2011-124570, dated Jun. 4, 2013.

Yoichi Yamashita, "E3 2006—Mr. Gates comes to explain new concept for expanding use of Xbox Live to PCs and cell phones" [online article], 4 pages (Mynavi Corporation, searched on May 30, 2013) <URL http://news.mynavi.jp/articles/2006/05/12/xbox/index.html> <URL2 http://news.mynavi.jp/photo/articles/2006/05/12/xbox/images/003I.jpg> published on May 12, 2006. (for relevancy, see p. 2, paragraph 1 of JP Office Action dated Jun. 4, 2013).

Toshiyasu Hirasawa, "E3 2006 'Microsoft booth': A casual game service for cell phones reveals details of Live Anywhere—also targeting Java or BREW (1/2)," [online article], 3 pages (ITmedia, Inc., searched on May 30, 2013) <URL http://www.itmedia.co.jp/games/articles/0605/12/news093.html> published on May 12, 2006 (for relevancy see p. 2, paragraph 1 of JP Office Action dated Jun. 4, 2013).

\* cited by examiner

US 8,849,912 B2

INFORMATION PROCESSING DEVICE, SERVER, AND INFORMATION PROCESSING SYSTEM

BACKGROUND OF THE INVENTION

1. Field of the Invention

The present invention relates to information processing devices and information processing systems.

2. Description of the Related Art

Game devices provided with communication facilities are widely used, allowing multiple users to enjoy a chat or an online game. Also, game programs are often installed in personal computers instead of devices designed especially for games. It is quite common for multiple users to enjoy an online game using personal computers.

Electronic appliances such as mobile game devices and personal digital assistants (PDA) have also been widely used. Recently, multiple-function electronic appliances such as smartphones, in which functions of a cell phone and a PDA are integrated, have become available. These electronic appliances are provided with a large-capacity memory and a high-speed processor and allow multiple users to chat or play an online game by downloading and installing an application program.

[patent document No. 1] U.S. Pat. No. 7,558,820

In order to synchronize the execution of the same application between multiple users, it is necessary to create a session of the application and to cause multiple users to participate in the session. Where users join each other to play a game, a session may be created through talks among the users so that each user can participate in the created session. If the users are in remote locations, they cannot see each other's situation with their own eyes. There is called for development of a user interface that allows users to see each other's situation easily.

It has also become possible for a single user to use a plurality of terminals so that each terminal can connect to (sign in) a game server using a user account that uniquely identifies the user in the game system. For example, a single user may have a desktop game console and a mobile game device and connect the console and the device to the game server on a network. When another user checks the status of the single user who has activated a plurality of terminals (for example, the console and the device), if information on all terminals of the single user is presented to the another user, it seems to be less easy for the another user to check the status of the single user because of the fair amount of the presented information. Therefore, there is called for development of user interface capable of presenting user status efficiently.

SUMMARY OF THE INVENTION

In this back ground, a purpose of the present invention is to provide a technology capable of presenting user status efficiently.

In order to address the challenge, the information processing device according to one embodiment of the present invention is controlled by a user and comprises: a communication unit; an acquisition unit configured to acquire via the communication unit two or more pieces of presence information including information identifying an application being run in two or more other information processing devices which use a same user account and; a status image generation unit configured to generate a status image indicating a status of a separate user identified by the user account, by referring to the acquired presence information, wherein the status image generation unit uses information identifying an application in which the latest status change occurs in the two or more other information processing devices, so as to generate the status image indicating the status of the separate user.

Another embodiment of the present invention also relates to an information processing device. The device is controlled by a user and connected to a plurality of other information processing devices controlled by other users via a server on a network, at least one of the other users controlling two or more information processing devices using a same user account, the device comprising: a first image generation unit configured to generate a first status image indicating a status of a plurality of other users, and a second image generation unit configured to generate, when one of the other users is selected in the first status image, a second status image indicating a status of the selected user, wherein the first image generation unit uses information identifying an application in which the latest change occurs in the other information processing devices so as to generate the first status image for each of the other users.

Still another embodiment of the present invention relates to an information processing system. The information processing system is configured to include a plurality of information processing devices, wherein each information processing device comprises: a communication unit; an execution unit configured to execute an application; a presence information generation unit configured to generate presence information including information identifying an application being executed; a transmission unit configured to transmit the generated presence information via the communication unit; an acquisition unit configured to acquire via the communication unit two or more pieces of presence information including information identifying an application being run in two or more other information processing devices which use a same user account and; a status image generation unit configured to generate a status image indicating a status of a separate user identified by the user account, by referring to the acquired presence information, wherein the status image generation unit uses information identifying an application in which the latest status change occurs in the two or more other information processing devices, so as to generate the status image indicating the status of the separate user.

Yet another embodiment of the present invention relates to a server. The server comprises: a communication unit; an acquisition unit configured to acquire via the communication unit two or more pieces of presence information including information identifying an application being run in two or more information processing devices which use a same user account; a data generation unit configured to generate a status image generation data for generating a status image indicating a status of a user by referring to the acquired presence information, wherein the data generation unit uses information identifying an application in which the latest status change occurs in the two or more information processing devices, so as to generate the status image generation data for generating the status image indicating the status of the user identified by the user account.

Optional combinations of the aforementioned constituting elements, and implementations of the invention in the form of methods, apparatuses, systems, computer programs, data structures, and recording mediums may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
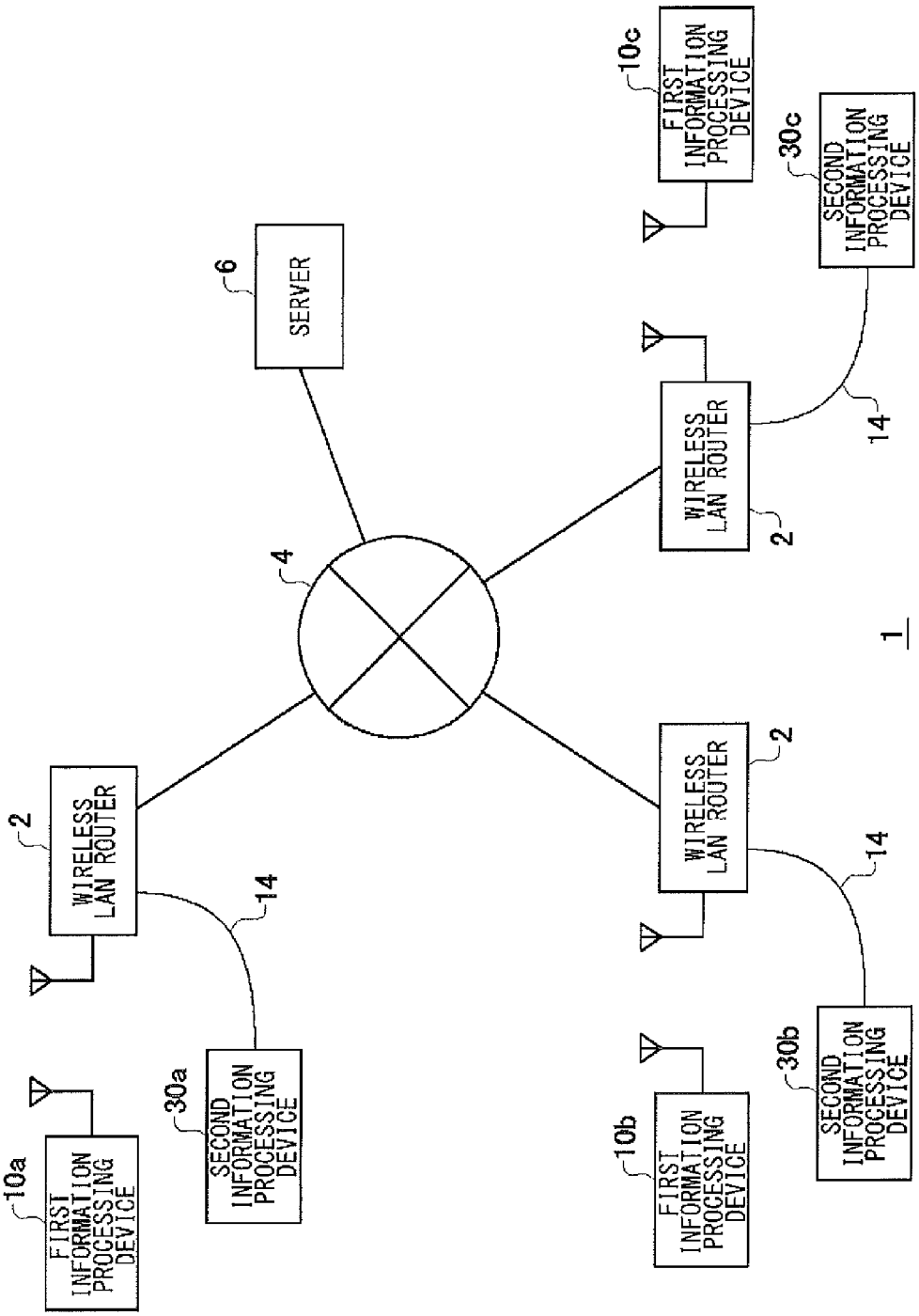
FIG. 1 shows an exemplary configuration of an information processing system according to the embodiment.

FIG. 1 shows an exemplary configuration of an information processing system 1 according to the embodiment. In the information processing system 1, first information processing devices 10a, 10b, and 10c (hereinafter, referred to as "first information processing devices 10" where no distinction is required), which are mobile terminal devices, and second information processing devices 30a, 30b, and 30c (hereinafter, referred to as "second information processing devices 30" where no distinction is required), which are desktop terminal devices, are connected via a server 6 so that the devices can exchange data. A wireless LAN router 2 has the functions of a wireless access point and a router. The first information processing devices 10 and the second information processing devices 30 are connected to a network 4 such as the Internet via the wireless LAN router 2 and a modem (not shown).

Each of the first information processing devices 10 has the function for wireless communication that allows the device 10 to connect to the server 6 on the network 4 via the wireless LAN router 2 to transmit local data to the server 6 and to receive data of another first information processing device 10 or second information processing device 30 from the server 6. The first information processing device 10 may be provided with functions of communicating using a wireless local area network (LAN) system so as to communicate with the server 6 in the infrastructure mode. The device 10 may communicate with the server 6 using a communication scheme employed in cell phones (e.g., the third-generation mobile communication system). In this case, the first information processing device 10 communicates with the server 6 via a base station, which provides a wide area of communication, so that users can use the first information processing device 10 outdoors.

The second information processing device 30 is connected to the wireless LAN router 2 by a cable 14. Each of the second information processing devices 30 connects to the server 6 on the network 4 via the wireless LAN router 2 to transmit local data to the server 6 and to receive data of another second information processing device 30 or first information processing device 10 from the server 6.

In this embodiment, the first information processing device 10 is a mobile game device, and the second information processing device 30 is a desktop game console. In the information processing system 1, a user has a user account identifying the user and signs in the network service provided by the server 6 by using the user account. In this embodiment, it is assumed that at least one user signs in the network service from a plurality of information processing devices. However, not all users need to sign in from a plurality of information processing devices.

The first information processing device 10a and the second information processing device 30a are controlled by user A and exchange data with the server 6 using an account (user account) that identifies user A. Similarly, the first information processing device 10b and the second information processing device 30b are controlled by user B and exchange data with the server 6 using an account (user account) that identify user B, and the first information processing device 10c and the second information processing device 30c are controlled by user C and exchange data with the server 6 using an account (user account) that identify user C.

The number of information processing devices controlled by each user need not be limited to two. A larger number of devices may be controlled by each user. Each user need not control the first information processing device 10 having the function for wireless communication and the second information processing device 30 having the function for cable communication. Alternatively, each user may control two information processing devices having the function for wireless communication or control two information processing devices having the function for cable communication. Not all users in the information processing system 1 need control two or more information processing devices. At least one user may sign in the network service from two or more information processing devices. The number of users need not be limited to three. A larger number of users may use the system.

Figure 2:
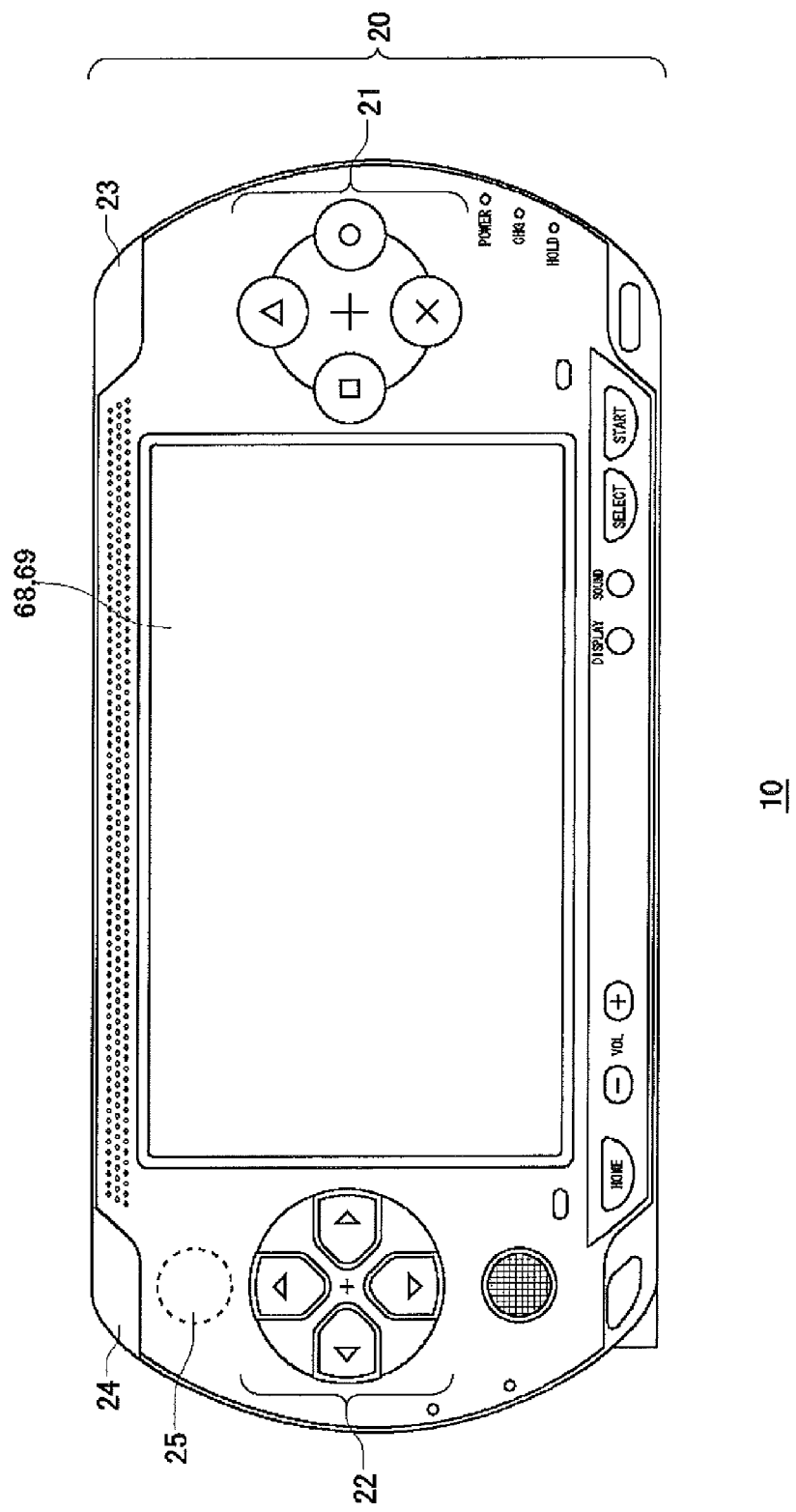
FIG. 2 shows an exemplary appearance of the first information processing device according to the embodiment.

FIG. 2 shows an exemplary appearance of the first information processing device 10 according to the embodiment. As shown in FIG. 2, the front face of the first information processing device 10 is provided with an input device 20 such as command input buttons 21, directional keys 22, an R button 23, and an L button 24, and is also provided with a display device 68. A touch panel 69 for sensing contact by the user's finger or a stylus pen is coupled to the display device 68. A rear touch panel may be provided on the backside of the first information processing device 10. Inside the first information processing device 10 is provided a tilt sensor 25 for sensing the tilt of the first information processing device 10.

The user holding the first information processing device 10 with both hands can control the command input buttons 21 with the right thumb, control the directional keys 22 with the left thumb, control the R button 23 with the right index finger or middle finger, and control the L button 24 with the left index finger or middle finger. To control the touch panel 69, the user may hold the first information processing device 10 with both hands and operate the touch panel 69 with the thumbs. Alternatively, the user may hold the first information processing device 10 with the left hand, operate the touch panel 69 with the right hand, operate the directional keys 22 with the left thumb, and operate the L button 24 with the left index finger or middle finger.

Figure 3:
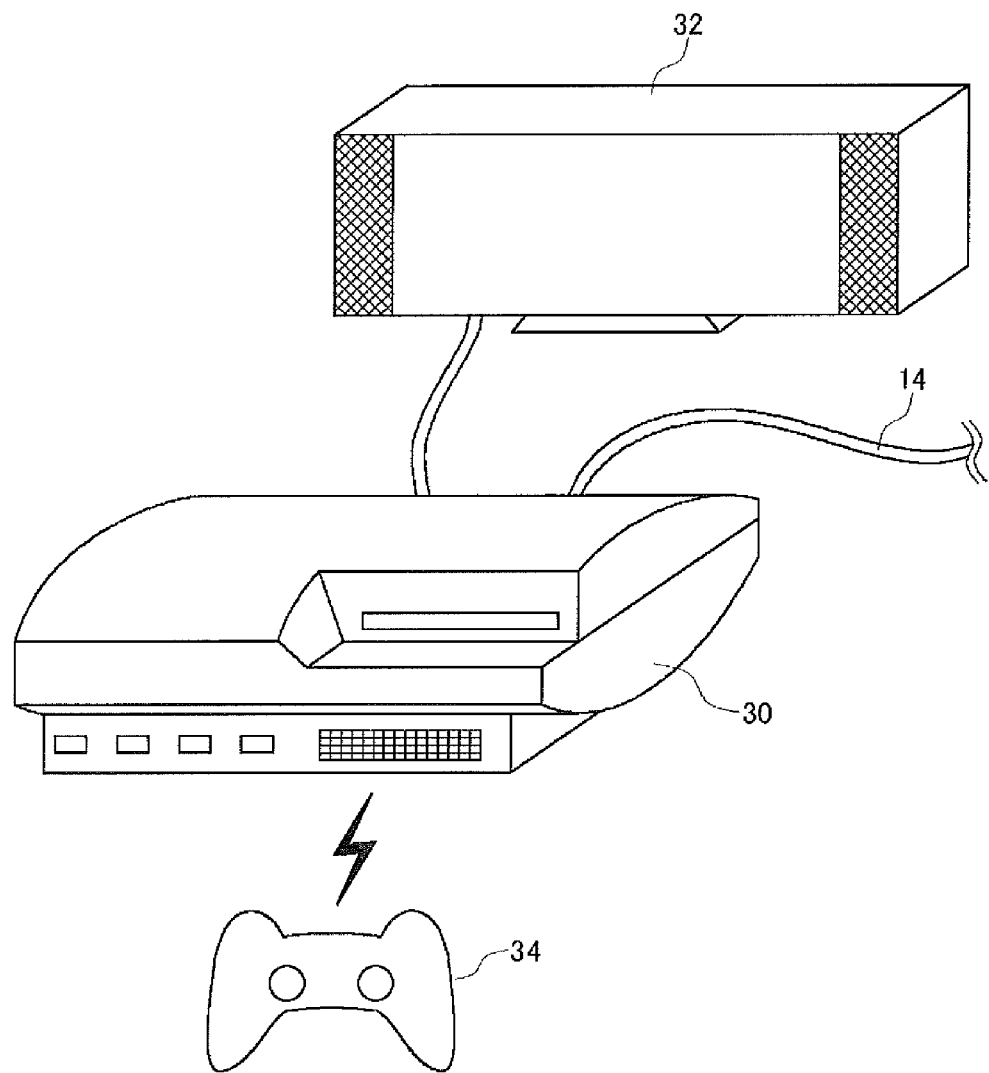
FIG. 3 shows an environment in which the second information processing device according to the embodiment is used.

FIG. 3 shows an environment in which the second information processing device 30 according to the embodiment is used.

The second information processing device 30 is connected to a user-controlled input device 34 wirelessly or by cable and acknowledges a control signal from the input device 34. The second information processing device 30 is connected to the display device 32 and outputs a result of processing to the display device 32. The display device 32 may be a television set provided with a display for outputting an image and with a speaker for outputting sound. Alternatively, the display device 32 may be a computer display. The display device 32 may be connected to the second information processing device 30 by cable or connected wirelessly using, for example, wireless LAN (Local Area Network).

Figure 4:
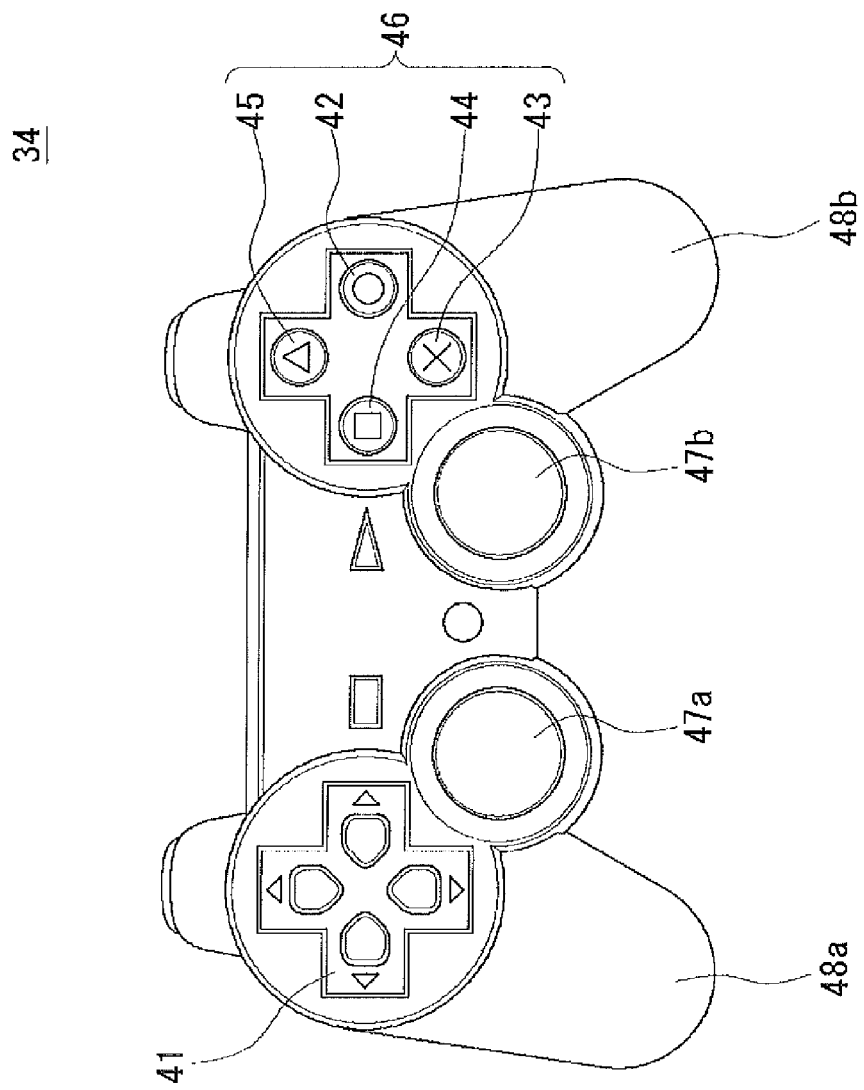
FIG. 4 shows the appearance of the input device.

FIG. 4 shows the appearance of the input device 34. The input device 34 is provided with directional keys 41, analog sticks 47a, 47b, and four control buttons 46, which are means for user control. The four buttons 46 comprise a circle button 42, a cross button 43, a square button 44, and a triangle button 45. The user holds a left grip 48a with the heft hand and holds a right grip 48b with the right hand to use the means for control. The input device 34 has the function of transferring a user input control signal to the second information processing device 30 and is configured to be able to communicate with the second information processing device 30 wirelessly.

A summary of the embodiment will be given. In the event of a status change, the first information processing device 10 or the second information processing device 30 signing in the network service generates presence information including the post-change status and transmits the generated presence information to the server 6. Generation of presence information is performed by a status management application or system software installed in the information processing device. For convenience of description, a summary of the embodiment will be given by way of an example in which the first information processing device 10a and the second information processing device 30a controlled by user A generate presence information and transmit the generated information to the server 6, and the first information processing device 10b controlled by user B acquires the presence information of user A by accessing the server 6 and generates a status image indicating the status of user A.

The status management application (or the system software) in the first information processing device 10a detects a status change in the first information processing device 10a. Typically, a status change is detected when an application (game) is started or when the application (game) is ended. If the first information processing device 10a is capable of running a plurality of applications at the same time, a status change is detected and presence information is generated when any of the applications is started or when any application is ended.

In the information processing system 1, each information processing device is capable of running an application in which a plurality of users can participate (multi-player online application). User A uses the first information processing device 10a to generate a command to create a session of the multi-player online application. Typical examples of the application include chat applications and games, but the application could be of another type. When the first information processing device 10a transmits the generated command to the server 6, the server 6 creates a session according to the command for creation. More specifically, the server 6 issues identification information identifying a session (hereinafter, referred to as "session ID") and transmits the session ID to the first information processing device 10a. The session ID may be a universal resource identifier (URI) for connecting to the server 6 used by another first information processing device 10 or second information processing device 30 participating in the session to communicate synchronously via the server 6. When a session ID is assigned from the server 6, the status management application in the first information processing device 10a detects a status change and generates presence information including the acquired session ID.

A status change is communicated from a game being run to the status management application. A game may arbitrarily define points of status changes. For example, a point of status change may be defined to occur when a predetermined mission is cleared or when a predetermined item is acquired. When the status management application is notified of a status change from the game, the status management application detects the status change and generates presence information.

As described above, when the first information processing device 10a of user A detects a change in its own status, the device 10a enerates presence information and transmits the generated information to the server 6. A similar process is performed in the second information processing device 30a of user A. When there is a status change, the second information processing device 30a generates presence information and transmits the generated information to the server 6.

The server 6 manages presence information respectively transmitted from the first information processing device 10a and the second information processing device 30a of user A. The first information processing device 10a and the second information processing device 30a transmit presence information to the server 6 each time a status change is detected. Of the presence information transmitted from the first information processing device 10a and the second information processing device 30a, the server 6 may store only the latest presence information of the respective devices. In this case, the volume of stored data for the user A can be reduced by storing only the latest presence information of the first information processing device 10a and the latest presence information of the second information processing device 30a in the server 6. The server 6 may store a predetermined number of items of presence information transmitted from the first information processing device 10a and the second information processing device 30a, respectively.

The first information processing device 10b of another user (i.e., user B in this summary) acquires the presence information of user A by periodically accessing the server 6. When the first information processing device 10b acquires the both presence information of the first information processing device 10a and the second information processing device 30a of user A, the first information processing device 10b identifies the latest of the acquired presence information.

User A has started the first information processing device 10a and the second information processing device 30a, and the first information processing device 10a and the second information processing device 30a are controlled by user A. It is rare, however, that user A is using both at the same time. Normally, user A is using only one of the devices. Therefore, the first information processing device 10b generates a status image indicating the status of user A based on the latest of the two items of presence information of user A and presents the status image to user B. This allows user B to know the situation of user A easily.

Each of the first information processing device 10a and the second information processing device 30a of user A includes status information indicating the status of execution of the application in the presence information. The status information includes information indicating whether participation in the session of the application is permitted or not. When the first information processing device 10b of user B acquires the presence information of user A, the device 10b generates a GUI indicating the status of the application in the first information processing device 10a and the second information processing device 30a of user A in accordance with the status information, and presents whether user B can participate in the session of the application or not.

If the status information includes information indicating a permission for participation, the first information processing device 10b generates a GUI indicating that user A is executing the application that user B can participate in. If the status information includes information indicating a prohibition for participation, the first information processing device 10*b* does not generate a GUI. This allows user B to check the status of the application which is being run by user A, therefore user B can easily see whether it is possible to participate in the session of user A.

Figure 5:
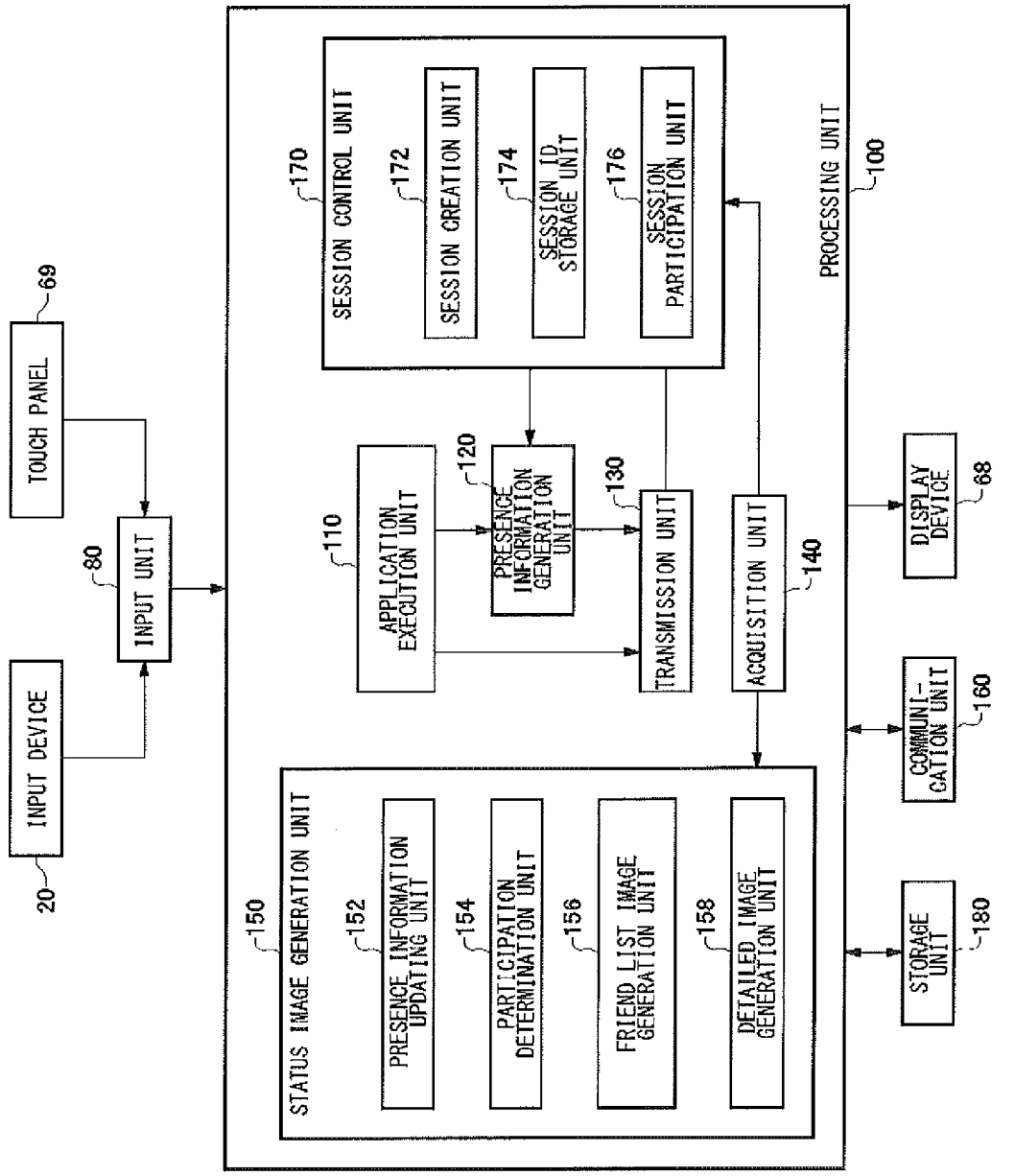
FIG. 5 shows functional blocks of the first information processing device.

FIG. 5 shows functional blocks of the first information processing device 10. The first information processing device 10 comprises an input device 20, a touch panel 69, an input unit 80, a processing unit 100, a display device 68, a communication unit 160, and a storage unit 180. The elements depicted in FIG. 5 are implemented by hardware components such as a CPU and a memory of an arbitrary computer, or by a program etc., loaded into the memory. FIG. 5 depicts functional blocks implemented by the cooperation of these elements. Therefore, it will be obvious to those skilled in the art that the functional blocks may be implemented in a variety of manners by hardware only, software only, or a combination of thereof.

The second information processing device 30 also comprises components similar to the functional blocks of the first information processing device 10 shown in FIG. 5. Of the components shown in FIG. 5, the second information processing device 30 comprises the input unit 80, the processing unit 100, the storage unit 180, and the communication unit 160. Referring to FIG. 3, the input device 20 and the display device 68 shown in FIG. 5 correspond to the input device 34 and the display device 32 connected to the second information processing device 30.

The input unit 80 acknowledges a user command entered by using the input device 20 or the touch panel 69. The communication unit 160 is connected to the server 6 to transmit presence information generated in the processing unit 100 and to acquire presence information generated in another information processing device. The communication unit 160 may be directly connected to another first information processing device 10 by cable or wirelessly so as to transmit and receive presence information. When the processing unit 100 acquires presence information of an information processing device controlled by the other user, the processing unit 100 generates a status image indicating the status of the other user and presents the generated image to the user. The display device 68 displays the status image generated by the processing unit 100 or displays a screen showing the application being executed.

The processing unit 100 comprises an application execution unit 110, a presence information generation unit 120, a transmission unit 130, an acquisition unit 140, a status image generation unit 150, and a session control unit 170. The status image generation unit 150 comprises a presence information updating unit 152, a participation determination unit 154, a friend list image generation unit 156, and a detailed image generation unit 158. The session control unit 170 comprises a session creation unit 172, a session ID storage unit 174, and a session participation unit 176. The status image generation unit 150 uses information identifying an application in which the latest status change occurs in two or more other information processing devices which are controlled by a separate (another) user and connected to the server 6 using a same user account, and generates a status image indicating the status of the separate user who is identified by the user account. Herein, the separate user is other than the user whose information processing device generates the status image.

The session control unit 170 controls a process related to a session of an application by cooperating with the server 6. More specifically, the session control unit 170 has the role of allowing the first information processing device 10 to participate in a session of an application by allowing the session creation unit 172 to generate a command to create a session, allowing the session ID storage unit 174 to store a session ID defined by the server 6, and allowing the session participation unit 176 to include the session ID stored in the session ID storage unit 174 in the transmission data. The function of the session control unit 170 may be implemented by an application run by the application execution unit 110. The session ID defined by the server 6 may be delivered to the application so that the application participates in the session using the session ID.

The information processing device according to the embodiment communicates presence information indicating its own status to another information processing device which is controlled by another user via the server 6 and acquires presence information indicating the status of the another information processing device from the another information processing device via the server 6. A description will be given below of a case where the first information processing device 10*a* of user A, by way of example, in the information processing system 1 transmits presence information, and the first information processing device 10*b* of user B, by way of example, acquires presence information of another user. All of the first information processing devices 10 and the second information processing devices 30 are provided with functions of both transmitting and receiving presence information. It is not that only the first information processing device 10*a* is provided with the transmission function, or only the first information processing device 10*b* is provided with the reception function.

<Function of Transmitting Presence Information>

The application execution unit 110 in the first information processing device 10*a* starts an application such as a chat application or a game in which a plurality of users can participate, in accordance with a control command acknowledged by the input unit 80. In this process, the session creation unit 172 generates a command to create a session for allowing another user to participate in the application, and the transmission unit 130 transmits the command to the server 6. The command to create a session includes identification information (user account) of user A and information identifying the application (hereinafter, referred to as "application ID"). Upon receipt of the command to create a session, the server 6 defines a session ID and creates a session of the application executed by the application execution unit 110. The server 6 transmits the session ID to the first information processing device 10*a* and the acquisition unit 140 acquires the session ID via the communication unit 160. The acquired session ID is stored in the session ID storage unit 174. As described above, the functions of the session control unit 170 may be implemented by the application executed by the application execution unit 110.

The application execution unit 110 may execute a plurality of multiplayer online applications concurrently. To execute a plurality of applications concurrently, the session creation unit 172 generates a command to create a session for each application. The server 6 creates a session for each received command for creation and communicates the respective session ID to the first information processing device 10*a*.

The application execution unit 110 generates status information indicating the status of execution of the application by user A and executes the application accordingly. The status information indicates whether participation of another user in the application being executed is permitted or not. For example, the status information may be represented by a flag value such that a flag value of 1 represents participation permission information indicating that another user can participate and a flag value of 0 represents participation prohibition information indicating that another user cannot participate.

For example, the application execution unit 110 may define a limit to the number of participants in a chat session. The user may enter an upper limit to the number of participants in an application. Where an upper limit is defined for the number of participants, the application execution unit 110 delivers status information having a flag value of 1 indicating that participation is possible (participation permission information) to the presence information generation unit 120 if the number of participants is not reached to the upper limit. If the number of participants is reached to the upper limit, the application execution unit 110 delivers status information having a flag value of 0 indicating that participation is impossible (participation prohibition information) to the presence information generation unit 120. In a game session of a car race, for example, the application execution unit 110 delivers status information having a flag value of 1 to the presence information generation unit 120 before the race is started. Once the race is started, the application execution unit 110 delivers status information having a flag value of 0 to the presence information generation unit 120. Thus, the application execution unit 110 determines whether another information processing device of another user can participate in the session of the application being run. As described, the information processing system 1 is configured such that determination as to whether another user can participate in an application session is made by the application itself and the result of determination is delivered to the presence information generation unit 120 as status information.

The presence information generation unit 120 generates presence information including a user account, information identifying the device, a session ID, a time stamp identifying the date and time that the presence information is generated, an application ID, and status information indicating the status of execution of the application. In case a plurality of applications are being run concurrently, the session ID's and application ID's of the applications, and the status information of the applications are included in the presence information. The presence information generation unit 120 stores the latest status information of each of the applications in the storage unit 180. If a status change occurs in any of the applications, the presence information generation unit 120 generates presence information including the latest status information of each of the applications. The information identifying the device includes an ID (device ID) for identifying the information processing device and information related to the device name. The information related to the device name may be a label given to the information processing device. Alternatively, the information may identify whether the device is the first information processing device 10 or the second information processing device 30. In this embodiment, the label given to the first information processing device 10 is assumed to be "PortableGameMachine" and the label given to the second information processing device 30 is assumed to be "GameConsole". In practice, a generally used name is used. The presence information may also include information such as a history of playing games in the first information processing device 10a and a language that can be used.

The presence information generation unit 120 generates presence information by receiving the application ID and the application status information from the application execution unit 110 and receiving the session ID from the session ID storage unit 174. If the application maintains the session ID, the session ID is provided by the application. If, for example, a history of playing is included in the presence information, the presence information generation unit 120 reads necessary information from the storage unit 180.

In the event that a change occurs in the status of the first information processing device 10a, the presence information generation unit 120 generates (updates) the presence information. For example, if the status of the application changes, the presence information generation unit 120 updates the presence information. Typical examples of points of status change include the following:

(1) When an application is started.
(2) When it becomes possible for another user to participate in an application session.
(3) When it becomes impossible for another user to participate in an application session from where participation of another user was initially possible.
(4) When an application is ended.

Points of status change may not be limited to (1)-(4) above. Additional changes may be arbitrarily defined by the application. The points of status change thus defined prompt the updating of the presence information.

In connection with points of status change discussed above, the relationship between the application ID and the status information included in the presence information will be described below.

When an application is started, the presence information includes an application ID and status information having a flag value of 0 (participation prohibition information).

When another user is allowed to participate in the application, the application ID and the status information having a flag value of 1 (participation permission information) are included in the presence information.

When another user is no longer allowed to participate in the application, in which another user was allowed to participate previously, the application ID and the status information having a flag value of 0 (participation prohibition information) are included in the presence information.

When the application is ended, neither the application ID nor the status information is included in the presence information.

In other words, presence information indicating the termination of the application is generated in this case by not including the application ID, etc. in the presence information.

In the example discussed above, the status information represents information indicating a permission or a prohibition for participation. Alternatively, where the clearing of a predetermined mission in a game or obtaining of a predetermined item is defined as a point of status change, the clearing of a mission or the obtaining of an item may be included in the presence information as status information.

The transmission unit 130 transmits the presence information generated by the presence information generation unit 120 to the server 6 via the communication unit 160. Described above is a process in the first information processing device 10a for transmitting presence information.

A similar process is performed in the second information processing device 30a of user A. Similarly, a similar process is performed in the first information processing device 10b and the second information processing device 30b of user B, and first information processing device 10c and the second information processing device 30c of user C. In other words, in the event of a change in the status of an application, each information processing device includes the latest post-change status in the presence information and transmits the resultant presence information to the server 6. Where a plurality of applications are being executed and a status change occurs in any of the applications, the presence information generation unit 120 includes the latest post-change status information in the presence information. For applications where a status change does not occur, the presence information generation unit 120 includes the latest status information stored in the storage unit 180 in the presence information. After the presence information generation unit 120 generates the presence information, the information processing device transmits the presence information to the server 6.

The server 6 collects the presence information transmitted from the information processing devices of each user. In the information processing system 1, each user signs in the network service from a plurality of information processing devices. The server 6 stores the presence information for each information processing device of the user. Taking user A for example, the server 6 stores the presence information transmitted from the first information processing device 10a and the presence information transmitted from the second information processing device 30a, linking the information to the account of user A. The server 6 stores only the latest presence information. Therefore, when new presence information is transmitted from the first information processing device 10a while the presence information of the first information processing device 10a is being stored, the previous presence information is overwritten by the new presence information in the server 6. The server 6 needs not overwrite the presence information and may store pieces of presence information for each information processing device until the number of pieces of presence information is reached to the upper limit.

The server 6 registers specific users called "friends" for each user in the form of a list. A friend is registered when an agreement is reached between users. By increasing friends, users can increase fellow users to chat or play a game with. The server 6 maintains a friend list of user B. When a request to acquire the presence information is received from the information processing device of user B, the server 6 transmits to user B the presence information on the users included in the friend list of user B. If users A and C are listed in the friend list of user B, the server 6 transmits to the information processing device of user B the presence information of the first information processing device 10a and the second information processing device 30a of user A, and the presence information of the first information processing device 10c and the second information processing device 30c of user C in response to the request to acquire the presence information.

<Function of Receiving Presence Information>

Acquisition by the first information processing device 10b of user B of the presence information of other users registered in the friend list of user B will be described by way of example. It will be assumed that users A and C are registered in the friend list of user B stored in the server 6.

The acquisition unit 140 in the first information processing device 10b periodically accesses the server 6 via the communication unit 160 to acquire the presence information of users A and C. It is preferable to ensure that the acquisition unit 140 does not acquire the presence information already acquired, namely, only acquires presence information which the acquisition unit 140 has not acquired yet if the unacquired presence information of users A and C is collected in the server 6.

The presence information acquired by the acquisition unit 140 may be the unmodified presence information generated in the first information processing device 10a and the second information processing device 30a of user A, and in the first information processing device 10c and the second information processing device 30c of user C, or modified presence information, i.e., information resulting from addition or deletion of some information in the server 6. In any case, the presence information acquired by the acquisition unit 140 includes a user account, device identification information, a session ID, a time stamp, an application ID, and application status information.

The status image generation unit 150 generates a status image showing the status of another user based on the acquired presence information. In this embodiment, the status of another user is represented by a name of an application executed in the information processing device of the another user. User B can easily know what application is being played by the another user by seeing the application name.

Figure 6:
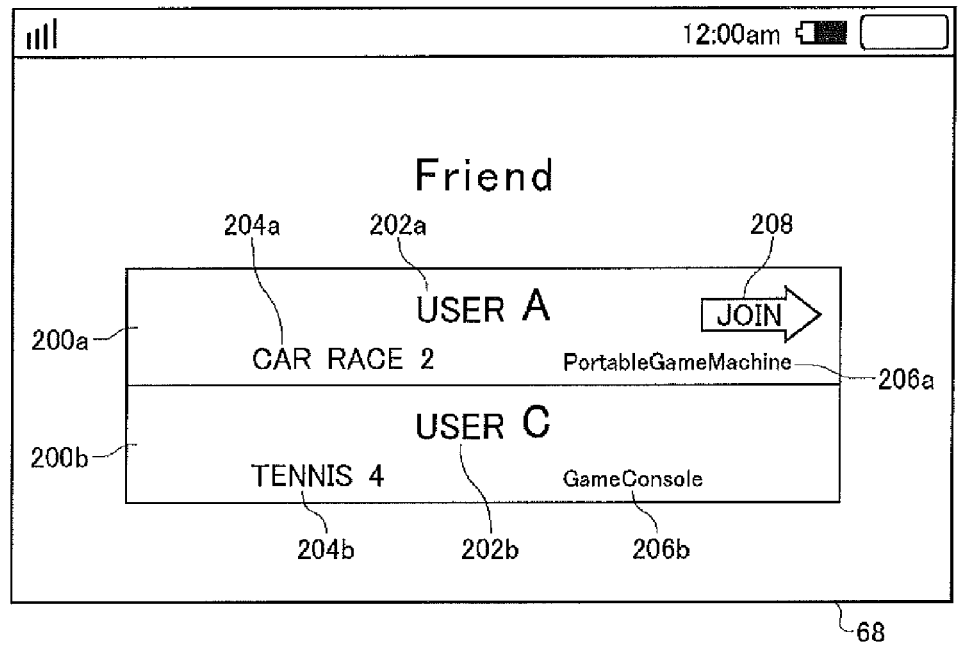
FIG. 6 shows an exemplary friend list screen.

FIG. 6 shows an exemplary friend list screen. When user B uses the input device 20 or the touch panel 69 to select a button on the menu screen (not shown) for displaying a friend list screen, the status image generation unit 150 generates a friend list screen. It is assumed here that users A and C are registered as friends of user B. The acquisition unit 140 in the first information processing device 10b acquires from the server 6 the presence information of the first information processing device 10a and the second information processing device 30a of user A, and the presence information of the first information processing device 10c and the second information processing device 30c of user C. The status image generation unit 150 generates a status image showing the status of the users registered as friends based on the acquired presence information.

The presence information is transmitted to the server 6 each time a status change occurs in the information processing device. While the communication unit 160 remains connected to the network 4, the acquisition unit 140 periodically accesses the server 6. If the presence information of a friend of user B is updated, the server 6 transmits the updated presence information to the first information processing device 10b. Consequently, the acquisition unit 140 acquires the updated presence information. The acquisition unit 140 delivers the presence information to the presence information updating unit 152 of the status image generation unit 150. Upon receipt of the presence information, the presence information updating unit 152 overwrites the previous presence information in the storage unit 180.

Meanwhile, if the communication unit 160 does not remain connected to the network 4, the acquisition unit 140 acquires the presence information from the server 6 at a point of time that user B selects the display button for displaying a friend list screen. In this case, the server 6 transmits the latest presence information to the communication unit 160.

The presence information updating unit 152 identifies the source of transmission of the presence information based on the device identification information included in the presence information. If the presence information from the same transmission source is already stored in the storage unit 180, the presence information updating unit 152 overwrites the stored information by the new presence information. If the presence information from the transmission source is not stored in the storage unit 180, the presence information updating unit 152 stores the transmitted presence information in the storage unit 180. In this manner, the storage unit 180 will be storing the latest presence information for each information processing device of the friend. The presence information updating unit 152 may store a plurality of pieces of presence information in the storage unit 180 instead of overwriting the previous presence information. In this case, the presence information updating unit 152 may store the presence information for each information processing device of other users until a predetermined number of pieces of information is stored. Alternatively, the presence information updating unit 152 may store the presence information within a predetermined time from the current date and time (e.g., within six hours).

The participation determination unit 154 determines for each friend whether any application in which user B can participate is being executed by referring to the status information (participation permission/prohibition information) included in the presence information. User A has started the first information processing device 10a and the second information processing device 30a, and an application is being run in each of the devices. If at least one of the plurality of applications run in the first and second information processing devices 10a and 30a allows participation by user B, the participation determination unit 154 determines that user B can participate in the application being run by user A. To generate a friend list image, the participation determination unit 154 determines for each friend whether any application is being run that allows participation by user B.

The participation determination unit 154 may determine whether any application is being run that allows participation by user B by referring to the application ID in addition to the status information. Two types of information processing devices, i.e., the first information processing device 10 and the second information processing device 30, are co-located in the information processing system 1. The first and second information processing devices 10 and 30 are of different platforms. Some applications allow participation of other users on a different platform, but some applications do not. Whether participation is allowed depends on the application. The participation determination unit 154 refers to the device identification information included in the presence information and determines whether the application allows participation by user B based on the application ID included in the presence information. Therefore, even if the presence information includes information indicating a permission for participation, the participation determination unit 154 determines that user B cannot participate in an application, if the application identified by the application ID does not allow participation from information processing devices of a different platform and if the device identification information included in the presence information indicates that the application is run on a different platform from that of the first information processing device 10b.

The participation determination unit 154 determines whether the first information processing device 10b of user B is in an environment that can run the application. For example, if the software identified by the application ID included in the presence information is not installed in the first information processing device 10b, the participation determination unit 154 determines that user B cannot participate in the application.

The friend list image generation unit 156 uses the latest presence information of users A and C and the result of determination by the participation determination unit 154 to generate a friend list image and causes the display device 68 to display the image. A friend list image is a status image indicating the status of at least one other user. More specifically, the image includes the name of the game that at least one other user is playing. The friend list image generation unit 156 identifies the user of the presence information by referring to the user account included in the presence information. Where pieces of presence information acquired from two or more information processing devices include the same user account, the friend list image generation unit 156 refers to the latest presence information to generate a status image indicating the status of users.

The friend list screen shown in FIG. 6 shows, for each user, at least part of the latest presence information. A user status display area 200a shows the status of user A by displaying the name of the application, i.e., the game title, being run in the information processing device of user A. More specifically, a user name 202a in the user status display area 200a indicates the name (nickname) of user A. A game name 204a indicates the title of the game being run by user A. Device information 206a indicates the device name of the information processing device in which the game title identified by the game name 204a is being run. "PortableGameMachine" is a label given to the first information processing device 10a of mobile type.

The friend list image generation unit 156 reads the presence information of the first information processing device 10a and the second information processing device 30a of user A from the storage unit 180. The friend list image generation unit 156 compares the information on date and time identified by the time stamps included in the two pieces of presence information and identifies the latest presence information. The presence information updating unit 152 may store the presence information in the storage unit 180, mapping information on the date and time of storage to the presence information. If the presence information does not include a time stamp, the friend list image generation unit 156 may use the information on the date and time of storage which is mapped to the presence information to identify the latest of the two pieces of presence information.

The friend list screen shown in FIG. 6 indicates that the presence information of the first information processing device 10a is newer than the presence information of the second information processing device 30a and that the friend list image generation unit 156 extracts the application ID and the device identification information from the presence information of the first information processing device 10a to generate the game name 204a and the device information 206a in the user status display area 200a. The game name corresponds to the application ID. The friend list image generation unit 156 may derive the game name from the application ID. Alternatively, the game name may be included in the presence information. If the presence information of the second information processing device 30a is newer than the presence information of the first information processing device 10a, the friend list image generation unit 156 extracts the application ID and the device identification information from the presence information of the second information processing device 30a to generate the information to be displayed as the game name 204a and the device information 206a in the user status display area 200a.

A user status display area 200b shows the status of user C by displaying the name of the application being run in the information processing device of user C. A user name 202b in the user status display area 200b indicates the name (nickname) of user C. A game name 204b indicates the title of the game being run by user C. Device information 206b indicates the device name of the information processing device in which the game title identified by the game name 204b is being run. "GameConsole" is a label given to the second information processing device 30c of desktop type.

The friend list image generation unit 156 reads the presence information of the first information processing device 10c and the second information processing device 30c of user C from the storage unit 180. The friend list image generation unit 156 compares the information on date and time identified by the time stamps included in the two pieces of presence information and identifies the latest presence information. Since the presence information of the second information processing device 30c is newer than the presence information of the first information processing device 10c, the friend list image generation unit 156 extracts the application ID and the device identification information from the presence information of the second information processing device 30c to generate the game name 204b and the device information 206b in the user status display area 200b.

Thus, the friend list image generation unit 156 defines for each friend the game name 204 and the device information 206 in the user status display area 200, by referring to the latest presence information, allowing user B to know the latest status of friends.

By displaying, in the user status display area 200a of user A and the user status display area 200b of user C, only the name of one application (game title) in which the latest change occurs, user B can easily learn the status of friends A and C. Displaying all contents of the presence information of the information processing device used by friends would increase the amount of information, making it difficult for user B to know what friends A and C are doing currently. For this reason, only the latest presence information of friends is used to determine the content of display in the user status display area 200 in the friend list screen. This allows user B to easily know what information processing devices are used and what games are being played by users A and C.

As discussed, it is preferable that only the name of the application in which the latest change occurs is displayed in the user status display area 200. However, names of two or more applications may be displayed. In this case, too, it is preferable not to display the entire content of the presence information of the information processing devices controlled by the friends. The number of application names displayed is preferably limited to a predetermined number. The presence information updating unit 152 may store a predetermined number of pieces presence information in the storage unit 180 in the reverse chronological order of the time stamp so that the friend list image generation unit 156 uses the latest presence information and the recent presence information to include, in the user status display area 200, the names of two or more applications in which a status change occurs relatively recently. This allows user B to know what information processing device is used and what game is being played by user A.

A Join mark 208 in the user status display area 200a represents information indicating that user A is running an application in which user B can participate. If, as a result of referring to the result of determination by the participation determination unit 154, it is determined that the applications being run by user A include at least one in which user B can participate, the friend list image generation unit 156 adds the Join mark 208 in the user status display area 200a. In the friend list screen shown in FIG. 6, the Join mark 208 is added in the user status display area 200a of user A, but the Join mark 208 is not added in the user status display area 200b of user C. This indicates that the applications being run by user A include at least one in which user B can participate, but the applications being run by user C do not include any in which user B can participate.

As described, the friend list image generation unit 156 displays the user status display area 200a showing the status of user A determined by the participation determination unit 154 as running an application in which participation is allowed and the user status display area 200b of user C determined by the participation determination unit 154 as not running an application in which participation is allowed, using different modes of display. That is, the friend list image generation unit 156 displays the user status display area 200a and 200b in different modes. This allows user B to immediately know a friend running an application in which user B can participate.

The Join mark 208 added in the user status display area 200a of user A means that the applications being run by user A include one in which user B can participate and does not necessarily mean that user B can participate in the game title "CARRACE2" indicated by the game name 204a. For example, even if "CARRACE2" being run in the first information processing device 10a does not accept participation by user B, the Join mark 208 is added if an application being run in the second information processing device 30a accepts participation by user B.

The Join mark 208 merely exemplifies a mode of display indicating that participation is possible. Alternative modes of display may be used. For example, the friend list image generation unit 156 may let user B know that user A is running an application in which participation is allowed by causing the entirety of the user status display area 200a to flash and not causing the entirety of the user status display area 200b to flash. The friend list image generation unit 156 may display the user status display area 200 in different colors depending on whether participation is permitted or not. Alternatively, the friend list image generation unit 156 may use different character colors, character fonts, or character sizes. Since user B is interested in the fact that a friend is executing an application that user B can participate, the user status display area 200 for the user executing an application that user B can participate is preferably displayed in a mode distinguished from the other areas.

FIG. 6 shows two user status display areas 200. The number of user status display areas matches the number of friends. Therefore, the number of user status display areas 200 could be three or more, or one or less, depending on the number of friends. When user B selects a friend, user B can view detailed information on the selected friend. More specifically, when user B selects the user status display area 200a in the friend list screen, the user B can view the detailed information on user A. By selecting the user status display area 200b, the detailed information on user C can be viewed. The selection may be done by tapping the user status display area 200 and causing the touch panel 69 to sense the position of tapping. Alternatively, the selection may be made by moving the cursor by using the input device 20.

Figure 7:
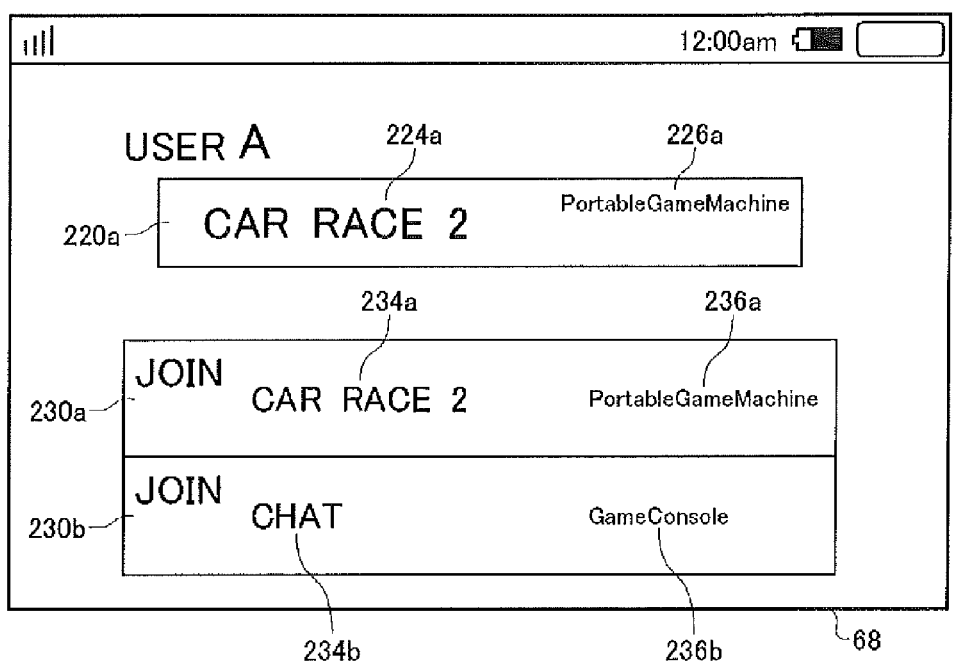
FIG. 7 shows an exemplary detailed friend information screen.

FIG. 7 shows an exemplary detailed friend information screen. When the user status display area 200a is tapped in the friend list screen shown in FIG. 6, the detailed image generation unit 158 generates a detailed information image indicating the status of user A based on the presence information on user A stored in the storage unit 180. The detailed friend information image indicates the status of a single user. More specifically, the image includes an area showing the name of the game that a single user is playing and an area showing the name of the game in which user B can participate.

The detailed image generation unit 158 generates a status image indicating the status of a single friend. The participation determination unit 154 determines whether the application accepts participation by referring to the status information (participation permission/prohibition information) included in the presence information. To generate a detailed friend information image, the participation determination unit 154 determines for each presence information whether any application is being run that allows participation by user B. As described above, the participation determination unit 154 may determine whether the application allows participation by user B by referring to the application ID in addition to the status information.

The detailed image generation unit 158 uses the presence information of user A and the result of determination by the participation determination unit 154 to generate a detailed information image of the friend and causes the display device 68 to display the image. The detailed image generation unit 158 reads the presence information of the first information processing device 10a and the second information processing device 30a from the storage unit 180 based on the user account of user A.

Referring to a detailed friend information screen shown in FIG. 7, the detailed image generation unit 158 generates a user status display area 220a showing an application name, and an application status display area 230 showing the name of an application determined by the participation determination unit 154 as allowing participation based on the latest presence information. The detailed image generation unit 158 may display the name of an application determined by the participation determination unit 154 as not allowing participation in a certain display area.

A user status display area 220a shows the status of user A by displaying the name of the application being run in the information processing device of user A. A game name 224a in the user status display area 220a indicates the title of the game being run by user A. Device information 226a indicates the device name of the information processing device in which the game title identified by the game name 224a is being run.

The detailed image generation unit 158 compares the information on date and time identified by the time stamps included in the presence information of the first information processing device 10a and of the second information processing device 30a and identifies the latest information. As described with reference to FIG. 6, since the presence information of the first information processing device 10a is newer than the presence information of the second information processing device 30a, the detailed image generation unit 158 extracts the application ID and the device identification information from the presence information of the first information processing device 10a to generate the game name 224a and the device information 226a in the user status display area 220a.

Thus, the detailed image generation unit 158 defines the game name 224a and the device information 226a in the user status display area 220a based on the latest presence information of user A, allowing user B to know the latest status of user A. The detailed image generation unit 158 locates the user status display area 220a at an easy-to-view position (e.g., toward the top) in the detailed friend information screen. It is preferable that the detailed image generation unit 158 locates the user status display area 220a above other displayed items such as the application status display area 230. By locating the user status display area 220a at the position that stands out most, user B can immediately understand what user A is currently doing.

The detailed image generation unit 158 may define the displayed content in the user status display area 220a based on a plurality of pieces of presence information. The user status display area 220a shown in FIG. 7 shows only the latest (one) application name. Alternatively, the user status display area 220a may display the names of two or more applications until a predetermined number is reached. For example, the detailed image generation unit 158 uses a plurality of pieces of presence information including time stamps close to the current date and time, so as to display the name of the game 224a in which a status change occurs in the user status display area 220a until a predetermined number is reached. This allows user B to immediately understand what game user A has played recently. By limiting the number of applications for which the name is displayed, the amount of displayed information is limited. Thus, the detailed image generation unit 158 may use the latest presence information and recent presence information to include the names of a predetermined number of applications in which a status change occurs close to the current date and time in the user status display area 220a.

The detailed image generation unit 158 also generates application status display areas 230a and 230b including the names of applications in which user B can participate, below the user status display area 220a. A game name 234a in the application status display area 230a indicates the title of the game being run by user A in the first information processing device 10a. Device information 236a indicates the device name of the first information processing device 10a in which the game title identified by the game name 234a is being run. A game name 234b in the application status display area 230b indicates the title of the game being run by user A in the second information processing device 30a. Device information 236b indicates the device name of the second information processing device 30a in which the game title identified by the game name 234b is being run.

The illustrated example indicates that the participation determination unit 154 determines that user B can participate both in "CARRACE2" being run in the first information processing device 10a and in "CHAT" being run in the second information processing device 30a. The information on each of the applications is thus displayed in the application status display areas 230a and 230b.

If there is any application determined as not allowing participation, it is preferable that the information on such application is displayed below the application status display areas 230a and 230b. Because the fact that an application in which user B can participate is being run is more useful to user B than the fact that an application in which participation is not allowed is being run, information is presented in an efficient manner by locating useful information more toward the top in the screen.

If any application is determined as not allowing participation, the name of that application may not be displayed. In particular, if the display device 68 is a small-sized display, information will be displayed in an efficient manner by not displaying less useful information. User B can obtain only those pieces of information that are useful to user B by configuring the detailed image generation unit 158 to display only the information on applications in which participation is allowed and not to display information on applications in which participation is not allowed. To include various information (not shown in FIG. 7) on user A (e.g., information on a history of playing) in the detailed friend information screen, it is preferable to exclude less useful information as much as possible. By presenting information necessary for user B and not presenting less useful information as much as possible, a user interface is implemented capable of presenting information efficiently.

The application status display area 230 is a graphical user interface. When user B taps the application status display area 230, the corresponding application is started so that user B can participate in the session of the application. For example, when user B taps the application status display area 230b, user B can participate in "CHAT" being run by user A in the second information processing device 30a.

More specifically, when user B taps the application status display area 230b, the application execution unit 110 acknowledges the tapping as a valid selection so as to start the chat application. The session ID storage unit 174 acquires the session ID extracted from the presence information of the second information processing device 30a. Alternatively, the session ID may be stored by the chat application itself. This allows the first information processing device 10b to conduct a chat with the second information processing device 30a using the session ID.

In a chat session, the first information processing device 10b transmits to the server 6 chat data that at least contains an input chat text, the session ID, and the user B's account. The server 6 transmits the chat data to the second information processing device 30a. The second information processing device 30a refers to the session ID included in the chat data so as to identify the chat session data, and displays the data in the chat window. Transmission of chat data from the second information processing device 30a to the first information processing device 10b proceeds similarly. This allows the second information processing device 30a and the first information processing device 10b to run a common application synchronously.

Figure 8:
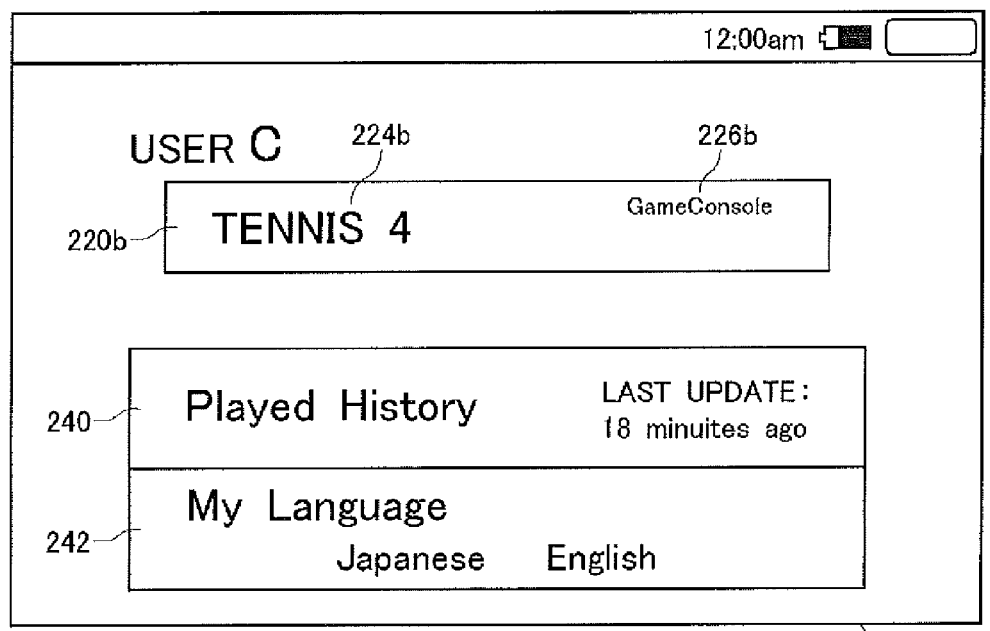
FIG. 8 shows another exemplary detailed friend information screen.

FIG. 8 shows another exemplary detailed friend information screen. When the user status display area 200b is tapped in the friend list screen shown in FIG. 6, the detailed image generation unit 158 generates a detailed information image indicating the status of user C based on the presence information on user C stored in the storage unit 180.

The participation determination unit 154 determines whether an application allows participation by referring to the status information (participation permission/prohibition information) included in the presence information. To generate a detailed friend information image, the participation determination unit 154 determines for each presence information whether any application is being run that allows participation by user B.

The detailed image generation unit 158 uses the presence information of user C and the result of determination by the participation determination unit 154 to generate a detailed information image of the friend and causes the display device 68 to display the image. The detailed image generation unit 158 reads the presence information of the first information processing device 10c and the second information processing device 30c from the storage unit 180 based on the user account of user C.

Referring to a detailed friend information screen shown in FIG. 8, the detailed image generation unit 158 generates a user status display area 220b showing an application name based on the latest presence information. The user status display area 220b shows the status of user C by displaying the name of the application being run in the information processing device of user C. A game name 224b in the user status display area 220b indicates the title of the game being run by user C. Device information 226b indicates the device name of the information processing device in which the game title identified by the game name 224b is being run.

In the illustrated detailed friend information screen, the application status display area 230 for displaying the names of applications in which user B can participate is not generated. This is because the participation determination unit 154 determines that none of the applications being run by user C allows participation by user B. This lets user B know that user B cannot participate in the applications being run by user C. User B can also know that none of the applications being run by user C allows participation by user B by seeing that the Join mark 208 is not attached in the user status display area 200b shown in FIG. 6.

FIG. 8 does not show the names of applications in which user B cannot participate. Alternatively, the names of all applications being run by a friend may be displayed in the detailed friend information screen. It is preferable that the name of the application in which participation is allowed and the name of the application in which participation is not allowed are displayed in different modes. For example, the "JOIN" mark (see FIG. 7) indicating that participation is possible may be attached in the neighborhood of the name of the application in which participation is possible, and the "JOIN" mark is not attached to the name of the application in which participation is not possible.

Referring to FIG. 8, detailed information of user C (e.g., a play history area 240 showing a history of playing by user C, or a language area 242 indicating the language that user C can use) is generated below the user status display area 220b.

Figure 9:
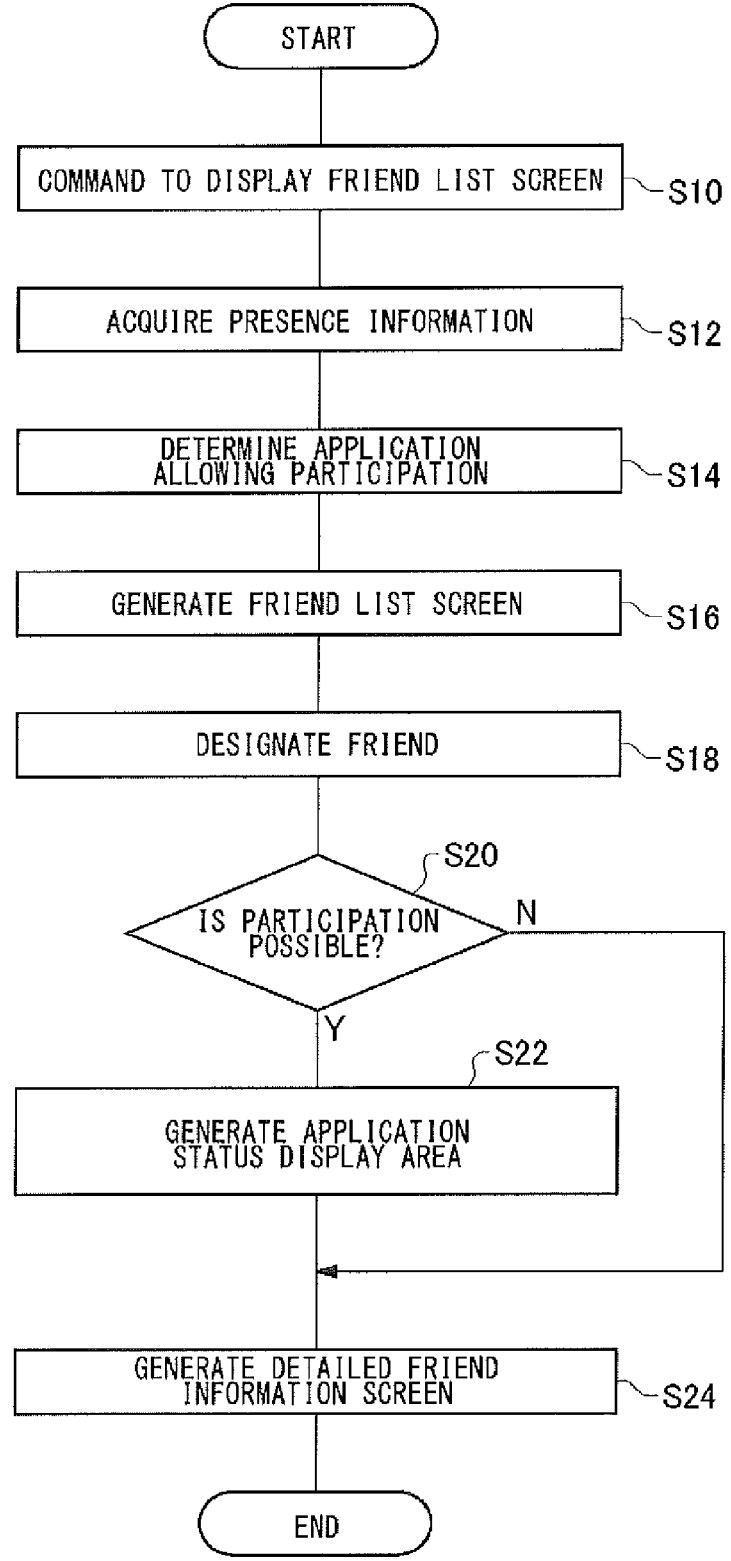
FIG. 9 is a flowchart showing the steps of generating the GUI shown in FIG. 7.

FIG. 9 is a flowchart showing the steps of generating the GUI shown in FIG. 7. When the user uses the input device 20 or the touch panel 69 to select a button on the menu screen for displaying a friend list screen (S10), the acquisition unit 140 periodically accesses the server 6 to acquire the presence information of friends registered in the user's friend list (S12). If the acquisition unit 140 acquires the presence information from the server 6 periodically, the friend list image generation unit 156 may read the presence information of friends from the storage unit 180.

The participation determination unit 154 determines for each friend whether any application in which user B can participate is being executed by referring to the presence information (S14). The friend list image generation unit 156 uses the latest presence information of a friend and the result of determination by the participation determination unit 154 to generate the friend list image shown in FIG. 6 (S16).

When the user subsequently selects the user status display area 200 of any of the friends and designates a friend accordingly (S18), the participation determination unit 154 determines whether the application being run by the friend allows participation (S20). The detailed image generation unit 158 generates the application status display area 230 (S22) and the detailed friend information screen (S24) for the application determined as allowing participation (Y in S20). Meanwhile, the detailed image generation unit 158 generates the detailed friend information screen (S24) but does not generate the application status display area 230 for the application determined as not allowing participation (N in S20).

Described above is an explanation based on an exemplary embodiment. The embodiment is intended to be illustrative only and it will be obvious to those skilled in the art that various modifications to constituting elements and processes could be developed and that such modifications are also within the scope of the present invention.

The plurality of first information processing devices 10 according to the embodiment are described as being connected in the infrastructure mode of wireless LAN. Alternatively, the first information processing devices 10 may be connected in the ad hoc mode. In this case, the first information processing devices 10 can generate a status image suited to the status of the application in another first information processing device 10 by exchanging presence information with each other.

The acquisition unit 140 of the information processing device according to the embodiment is described as acquiring presence information by periodically accessing the server 6. Alternatively, the server 6 may transmit presence information to the information processing device. In this case, the server 6 may periodically transmit presence information of all users listed in the friend list of the user of the information processing device. Alternatively, the server 6 may transmit updated presence information each time the presence information of a user listed in the friend list is updated.

The acquisition unit 140 of the information processing device according to the embodiment is described as acquiring presence information generated in two or more information processing devices of a friend from the server 6, and the status image generation unit 150 is described as generating a status image indicating the status of a friend by referring to the latest presence information. In a variation, the server 6 is responsible for generating display data to be used by the friend list image generation unit 156 and the detailed image generation unit 158. More specifically, the server 6 determines displayed content to be included in a friend list image and generates data for the friend list image accordingly in accordance with a request to generate a friend list image from the information processing device. Further, the server 6 determines displayed content to be included in a detailed friend information image and generates data for the detailed friend information image in accordance with a request to generate a detailed friend information image.

More specifically, in response to a request from the information processing device of user B to generate a friend list image, the server 6 reads the presence information of users A and C included in the friend list of user B, identifies the latest presence information of users A and C, and determines the displayed content to be included in the friend list image (see FIG. 6). Further, in response to a request to generate a detailed information image of user A, the server 6 reads the presence information of user A, identifies the latest presence information of user A, and determines the displayed content to be included in the detailed friend information image (see FIG. 7).

Preferably, the function of the participation determination unit 154 for keeping track of the situation of application installation in the information processing device of user B and determining whether user B can participate in the application is implemented in the server 6. This allows the whole functions of the status image generation unit 150 to be transferred to the server 6 and reduces the processing load of the information processing device accordingly. The function of the participation determination unit 154 may be provided in the information processing device and the process of generating a status image may be jointly executed by the server 6 and the information processing device.

The server 6 is provided with a communication unit, an acquisition unit configured to acquire via the communication unit two or more pieces of presence information including information identifying an application being run in two or more information processing devices which use a same user account, and a data generation unit configured to generate status image generation data for generating a status image indicating the status of a friend in the information processing device by referring to the acquired presence information.

The data generation unit includes at least part of the functions of the status image generation unit 150 described in the embodiment. The data generation unit uses information identifying an application in which the latest status changes occurs in two or more information processing devices of the same user account, so as to generate status image generation data for generating a status image indicating the status of the user identified by the user account. In response to a request from the information processing device of user B to generate a friend list image, the data generation unit reads the presence information of users A and C included in the friend list of user B, identifies the latest presence information of users A and C, and generates display data for generating a friend list image (see FIG. 6) In response to a request to generate a detailed information image of user A, the data generation unit reads the presence information of user A, identifies the latest presence information of user A, and generates display data for generating a detailed friend information image (see FIG. 7). When the data generation unit generates display data, the communication unit transmits the display data to the information processing device of user B. The information processing device of user B uses the received display data to generate a friend list image (see FIG. 6) or a detailed friend information image (see FIG. 7) and displays the image on the display device 68.

What is claimed is:

1. An information processing device controlled by a user, comprising:
    a communication unit;
    an acquisition unit configured to acquire via the communication unit two or more pieces of presence information including information identifying an application being run in two or more other information processing devices which use a same user account and;
    a status image generation unit configured to generate a status image indicating a status of a separate user identified by the user account, by referring to the acquired presence information,
    wherein the status image generation unit uses information identifying an application in which the latest status change occurs in the two or more other information processing devices, to generate the status image indicating the status of the separate user,
    wherein the presence information includes information indicating one of permission and prohibition of participation in a session of an application being run in at least one of the other information processing devices,
    wherein the status image generation unit comprises a second image generation unit configured to generate a status image indicating a status of a single separate user, and
    wherein, when the acquisition unit acquires two or more pieces of presence information including the same user account from two or more other information processing devices, the second image generation unit generates an area showing a name of an application by referring to the latest presence information and an area showing a name of an application which allows participation.

2. The information processing device according to claim 1, wherein, when the acquisition unit acquires two or more pieces of presence information including the same user account from two or more information processing devices, the status image generation unit generates the status image indicating the status of the separate user identified by the user account, by referring to the latest presence information.

3. The information processing device according to claim 1, wherein the status image generation unit generates the status image including an application name corresponding to application identification information included in the latest presence information which includes the user account of the separate user, the application name representing the status of the separate user.

4. The information processing device according to claim 3, wherein
    the presence information includes information related to a device name of the other information processing device generating the presence information, and
    the status image generation unit generates the status image including the application name and the device name both of which represent the status of the separate user.

5. The information processing device according to claim 1, wherein
    the presence information includes information indicating permission or prohibition of participation in a session of an application being run in the other information processing device, and the status image generation unit is provided with a participation determination unit configured to refer to the participation permission or prohibition information included in the presence information and determine for each separate user whether an application that allows participation is being run.

6. The information processing device according to claim 5, wherein
the status image generation unit is provided with a first image generation unit configured to generate a status image indicating a status of a plurality of separate users, and
the first image generation unit displays an area showing a status of a first user determined by the participation determination unit to indicate the first user running an application that allows participation, and an area showing a status of a second user determined by the participation determination unit to indicate the second user not running any application that allows participation, using different modes of display.

7. The information processing device according to claim 1, wherein the status image generation unit comprises a participation determination unit configured to refer to the participation permission or prohibition information included in the presence information and determine whether the application allows participation, and the second image generation unit generates the area showing the name of the application by referring to the latest presence information and the area showing the name of the application which is determined by the participation determination unit as allowing participation.

8. The information processing device according to claim 7, wherein the second image generation unit does not display a name of an application determined by the participation determination unit as not allowing participation.

9. The information processing device according to claim 1, further comprising:
an execution unit configured to execute an application;
a presence information generation unit configured to generate presence information including information identifying an application being run; and
a transmission unit configured to transmit the generated presence information via the communication unit.

10. An information processing device controlled by a user and connected to a plurality of other information processing devices controlled by other users via a server on a network, at least one of the other users controlling two or more information processing devices using a same user account, the device comprising:
an acquisition unit configured to acquire two or more pieces of presence information including information identifying an application being run in two or more of the information processing devices which use the same user account;
a first image generation unit configured to generate a first status image indicating a status of a plurality of other users, and
a second image generation unit configured to generate, when one of the other users is selected in the first status image, a second status image indicating a status of the selected user,
wherein the first image generation unit uses information identifying an application in which the latest change occurs in the other information processing devices so as to generate the first status image for each of the other users,
wherein the presence information includes information indicating one of permission and prohibition of participation in a session of an application being run in at least one of the information processing devices, and
wherein, when the acquisition unit acquires two or more pieces of presence information including the same user account from two or more of the information processing devices, the second image generation unit generates an area showing a name of an application by referring to the latest presence information and an area showing a name of an application which allows participation.

11. An information processing system configured to include a plurality of information processing devices,
wherein each information processing device comprises:
a communication unit;
an execution unit configured to execute an application;
a presence information generation unit configured to generate presence information including information identifying an application being executed;
a transmission unit configured to transmit the generated presence information via the communication unit;
an acquisition unit configured to acquire via the communication unit two or more pieces of presence information including information identifying an application being run in two or more other information processing devices which use a same user account and;
a status image generation unit configured to generate a status image indicating a status of a separate user identified by the user account, by referring to the acquired presence information,
wherein the status image generation unit uses information identifying an application in which the latest status change occurs in the two or more other information processing devices, to generate the status image indicating the status of the separate user
wherein the presence information includes information indicating one of permission and prohibition of participation in a session of an application being run in at least one of the information processing devices,
wherein the status image generation unit comprises a second image generation unit configured to generate a status image indicating a status of a single separate user, and
wherein, when the acquisition unit acquires two or more pieces of presence information including the same user account from two or more information processing devices, the second image generation unit generates an area showing a name of an application by referring to the latest presence information and an area showing a name of an application which allows participation.

12. A computer program that is embedded on a non-transitory computer-readable recording medium, comprising:
a module configured to acquire two or more pieces of presence information including information identifying an application being run in two or more information processing devices connected to a network by using a same user account; and
a module configured to generate a status image indicating a status of a user identified by the user account by referring to the acquired presence information,
wherein the module to generate the status image uses information identifying an application in which the latest status change occurs in the two or more information processing devices, to generate the status image indicating the status of the user identified by the user account,
wherein the presence information includes information indicating one of permission and prohibition of participation in a session of an application being run in at least one of the information processing devices, wherein the module configured to generate is configured to generate a status image indicating a status of a single separate user, and wherein, when the module configured to acquire acquires two or more pieces of presence information including the same user account from two or more information processing devices, the module configured to generate generates an area showing a name of an application by referring to the latest presence information and an area showing a name of an application which allows participation.

13. A server comprising:

a communication unit;

an acquisition unit configured to acquire via the communication unit two or more pieces of presence information including information identifying an application being run in two or more information processing devices which use a same user account;

a data generation unit configured to generate status image generation data for generating a status image indicating a status of a user by referring to the acquired presence information, wherein the data generation unit uses information identifying an application in which the latest status change occurs in the two or more information processing devices, to generate the status image generation data for generating the status image indicating the status of the user identified by the user account, wherein the presence information includes information indicating one of permission and prohibition of participation in a session of an application being run in at least one of the information processing devices, wherein the data generation unit is configured to generate status image generation data for generating a status image indicating a status of a single separate user, and wherein, when the acquisition unit acquires two or more pieces of presence information including the same user account from two or more information processing devices, the second image generation unit generates an area showing a name of an application by referring to the latest presence information and an area showing a name of an application which allows participation.

* * * * *